Aug. 4, 1964  M. A. DI FEDERICO  3,143,376
SPACER FOR DUAL RIMS
Filed Feb. 6, 1963

3,143,376
SPACER FOR DUAL RIMS
Mario A. Di Federico, Akron, Ohio, assignor to The Firestone Tire & Rubber Company, Akron, Ohio, a corporation of Ohio
Filed Feb. 6, 1963, Ser. No. 256,615
1 Claim. (Cl. 301—13)

This invention relates to rim-spacers and more particularly to annular spacers such as are used on vehicle wheels for effecting proper and accurate lateral spacing, or separation, of dual rims having pneumatic tires mounted thereon.

Rim-spacers presently in use are conventionally constructed of relatively heavy-gauge material. One conventional type of spacer is provided with edge corrugations which engage the rim gutters along a generally undulating or sinusoidal path. The result is that the spacer-corrugations bite into the rim-gutter metal destroying it, tending to loosen the assembly, and defeating the proper spacing. This type of spacer also presents a minimum wear surface to the rims (i.e. only the metal-thickness).

Another conventional type of spacer has turned-up edges, giving it the appearance of a channel-member; the disadvantage of this type of spacer lies in the tendency of the upstanding edges to deflect and collapse axially under load. With both of these types of failures, the result will thus be a tendency of the rim assembly to slip circumferentially with respect to the wheel, and defeat of the proper and accurate spacing.

The present invention solves the aforementioned difficulties by providing a rim-spacer having a novel structure, whereby the spacer can be constructed of lighter-gauge material with surprisingly increased strength and dimensional stability, while it eliminates all sharp, metal-destroying edges, and reduces the cost of manufacture.

It is therefore an object of this invention to provide a novel spacer for vehicle wheel rims, which is of improved stiffness, though light-weight in construction, while being economical in manufacture.

Another object is to provide a spacer having enlarged radial contact areas engaging the rims with which it is mounted.

These and other objects will become more apparent by reference to the following specification and drawings, in which.

Figure 1:
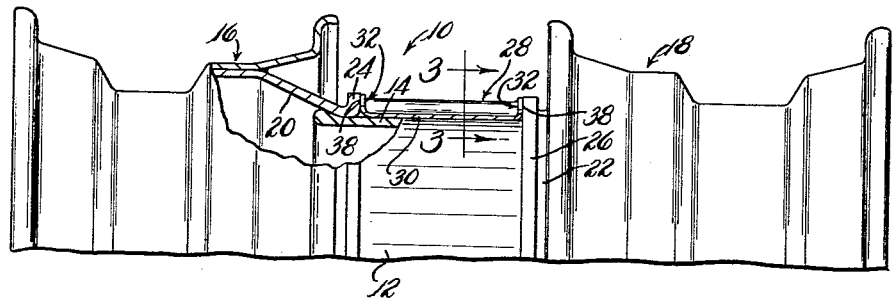
FIGURE 1 is a fragmentary view, partly broken away and in section, of a vehicle wheel having dual tire-rims mounted thereon, with the spacer of the invention positioned between said rims.
Figure 2:
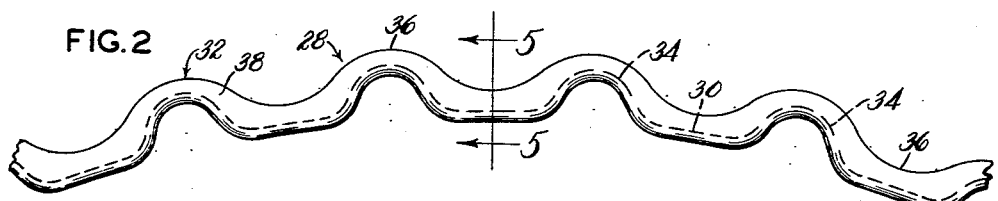
FIGURE 2 is an enlarged fragmentary side elevation of the spacer of FIGURE 1.
Figure 3:
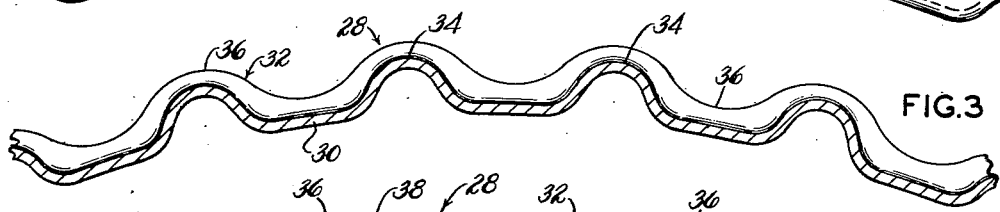
FIGURE 3 is an enlarged sectional view taken along line 3—3 of FIGURE 1.
Figure 4:
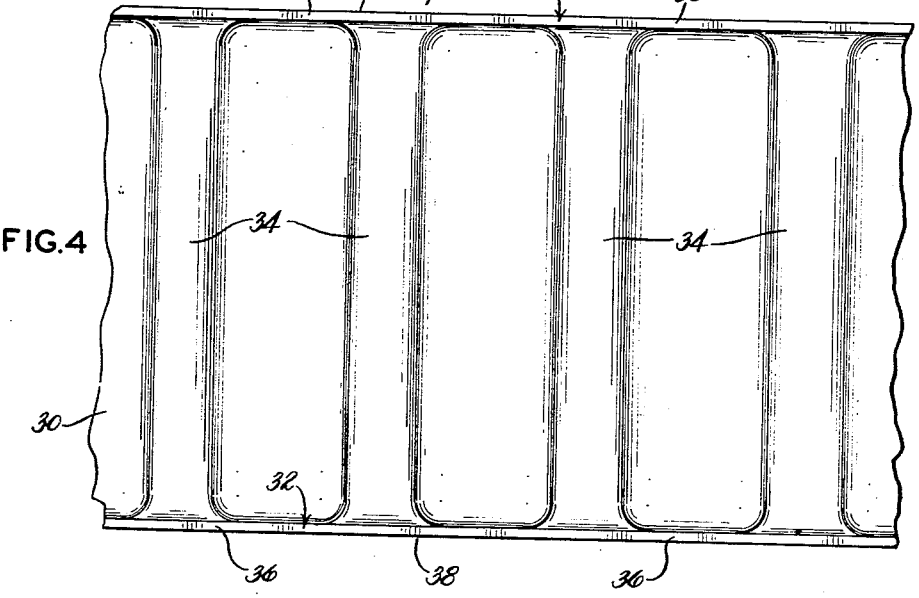
FIGURE 4 is an enlarged fragmentary plan view of the spacer of the invention.
Figure 5:
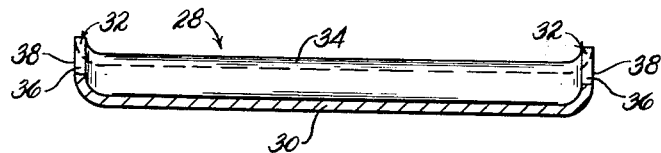
FIGURE 5 is an enlarged section view taken on line 5—5 of FIGURE 2.

Referring now to FIGURE 1 of the drawings, a vehicle wheel-and-rim assembly 10 comprises a wheel 12 having a seat 14 upon which rims 16 and 18 are supported by their mounting, or adapter, rings 20 and 22, respectively. Also supported on seat 14 between adapter-ring flanges 24 and 26 of rings 20 and 22, respectively, is spacer 28. The rims 16 and 18 and spacer 28 are secured on the wheel 12 by conventional means such as nuts and clamps, not shown, well-known to those skilled in the art.

As seen in FIGURES 2–5, the spacer 28 comprises generally an endless, annular member having a base portion 30 whose diameter provides a slip-fit on the wheel-seat 14; the base 30 is provided with a plurality of circumferentially spaced, radially outwardly protruding, transverse corrugations 34. Although shown as preferably extending generally axially and continuous of the spacer, these corrugations may cross the spacer at an angle to the edges thereof; they may, indeed, be interrupted, or take the form of entirely independent deformations along the opposite margins of the spacer, either aligned or staggered. At the corrugated margins of the spacer, the axial edges thereof are turned generally radially outwardly to form radial flanges 32, 32 whose undulations 36 correspond to the undulations of the spacer-base 30. In this manner, the spacer presents, toward each rim adapter ring flange 24 and 26, a circumferentially undulating radial bearing surface 38 of substantial area.

The spacer 28 is preferably formed in one piece by well-known forming operations, to provide a spacer without sharp marginal edges which might impede the trouble-free mounting of the spacer on the wheel or damage the flanges 24 and 26 of the adapter rings 20 and 22 during operation.

Figure 6:
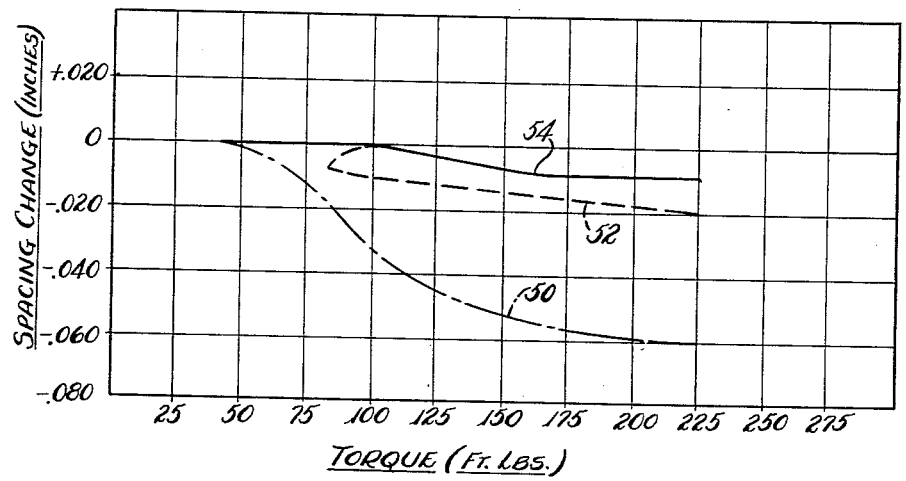
FIGURE 6 is a chart showing results of identical tests conducted with two spacers of the prior art and the spacer of the invention.

The spacer of the invention surprisingly provides a stronger, lighter-weight spacer than the spacers of the prior art. As shown in FIGURE 6, spacers of two prior art constructions and the spacer of the invention were subjected to identical tests, in which was measured the axial change in rim spacing in response to torque applied to the nut maintaining the two-rim-and-spacer assembly on the wheel. Torque figures are based on an average of three readings taken about the wheel circumference. After reaching the 100 ft.-lb. torque figure, the assembly was allowed to sit overnight to attain equilibrium.

The curve 50 shows the spacing change in a conventional prior art channel spacer formed of steel .109 inch thick. As the torque increases, the spacing between the rims is seen to decrease rapidly to .060 inch at 225 ft.-lbs., indicating increasing lateral collapse of the spacer and loss of accurate spacing.

The curve 52 shows the spacing change with a conventional prior art corrugated spacer formed of steel .094 inch thick. The assembly of curve 52 is seen to show a fairly constant spacing up to a torque reading of 100 ft.-lbs.; measurement after overnight rest of the system revealed, however, that the spacing had decreased with an attendant drop-off in torque to approximately 85 ft.-lbs. (i.e. the system had loosened). Increased torque application thereafter caused a further spacing decrease to about .020 inch at 225 ft.-lbs.

The curve 54 shows the spacing change with the spacer of the invention, formed of steel only .078 inch thick. It will be noted, surprisingly, the lighter-gauge spacer of the present invention proves to be more rigid laterally, with a change in axial spacing between the rims of only approximately .008 inch at 225 ft.-lbs. torque. Thus, this axially less deformable spacer of the invention presents a real advance in the art.

While one form of the invention has been shown and described, various modifications will occur to those skilled in the art without departing from the scope of the invention, as defined in the appended claim.

I claim:

A spacer for separating a pair of tire rims on a vehicle wheel, comprising an annular base having a plurality of uniform radial corrugations substantially equally spaced about its circumference and extending laterally from margin to margin thereof, said margins rising radially from said base into circumferentially undulating, straight-sided flanges having faces of substantial height adapted to engage the tire rims, respectively.

References Cited in the file of this patent

UNITED STATES PATENTS

| | | |
|---|---|---|
| 985,738 | Foster | Feb. 28, 1911 |
| 1,078,222 | Summa | Nov. 11, 1913 |
| 2,100,626 | Brink | Nov. 30, 1937 |
| 2,226,682 | Willoughby | Dec. 31, 1940 |
| 2,719,559 | Smith | Oct. 4, 1955 |
| 3,039,824 | Walther | June 19, 1962 |